June 11, 1929. R. W. BRICE 1,717,310
ICE CREAM CABINET
Filed March 2, 1928   2 Sheets-Sheet 1
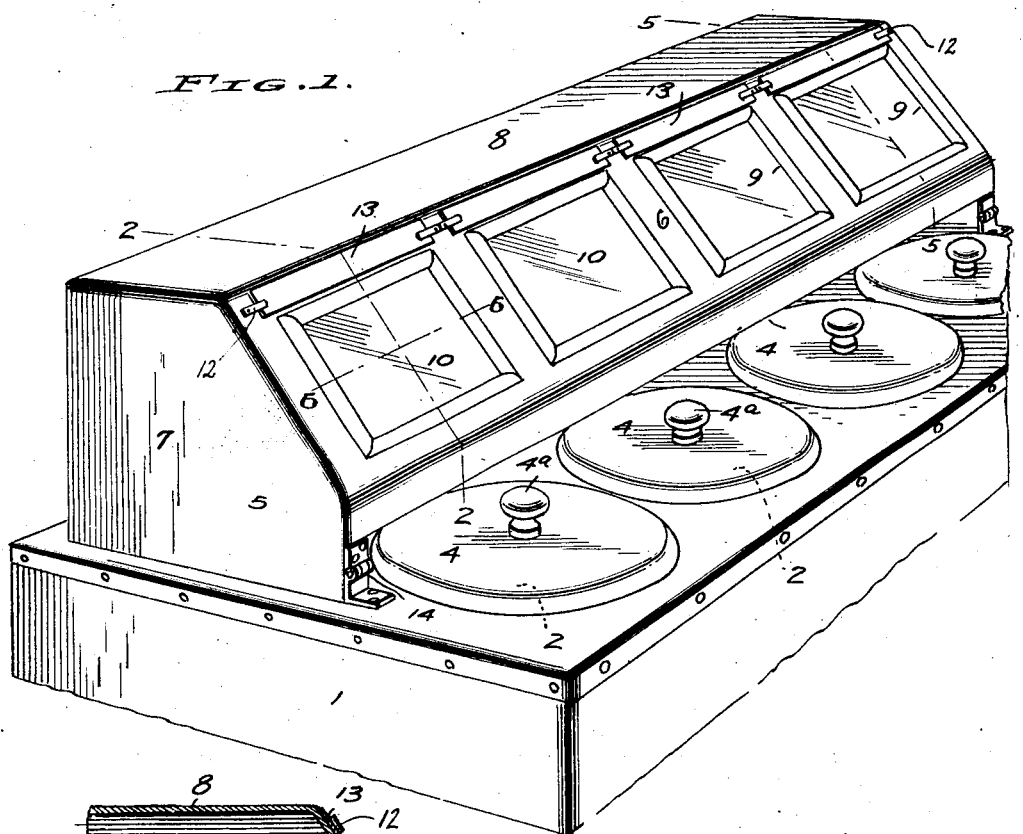
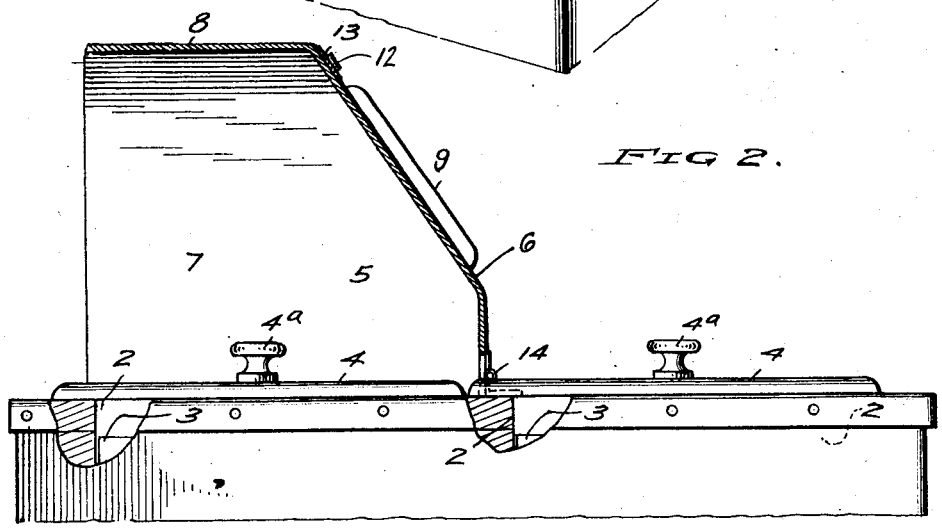
Inventor
Roy W. Brice
By Milo B. Stevens
Attorney June 11, 1929.  R. W. BRICE  1,717,310
ICE CREAM CABINET
Filed March 2, 1928   2 Sheets-Sheet 2
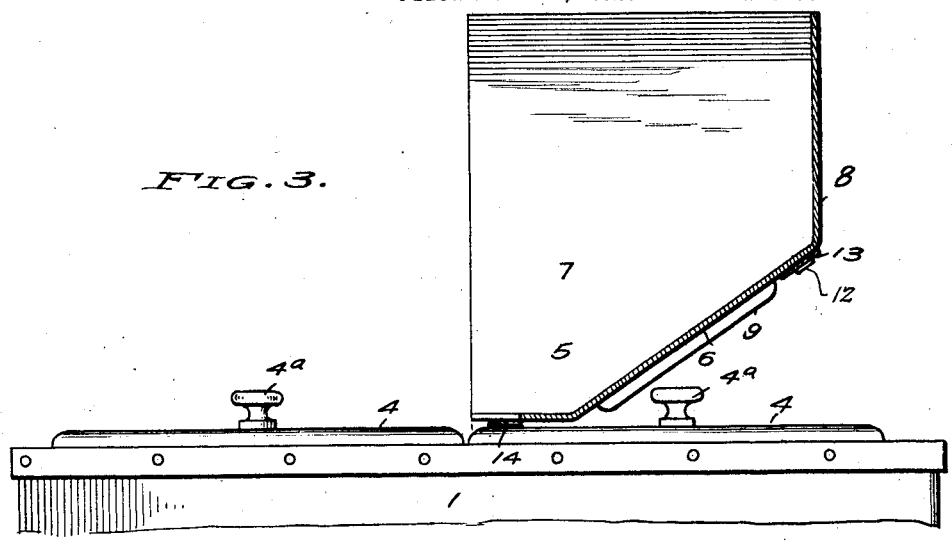
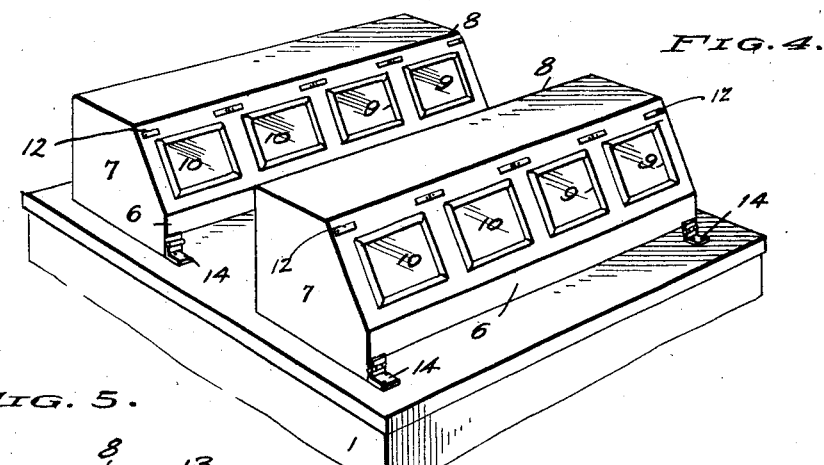
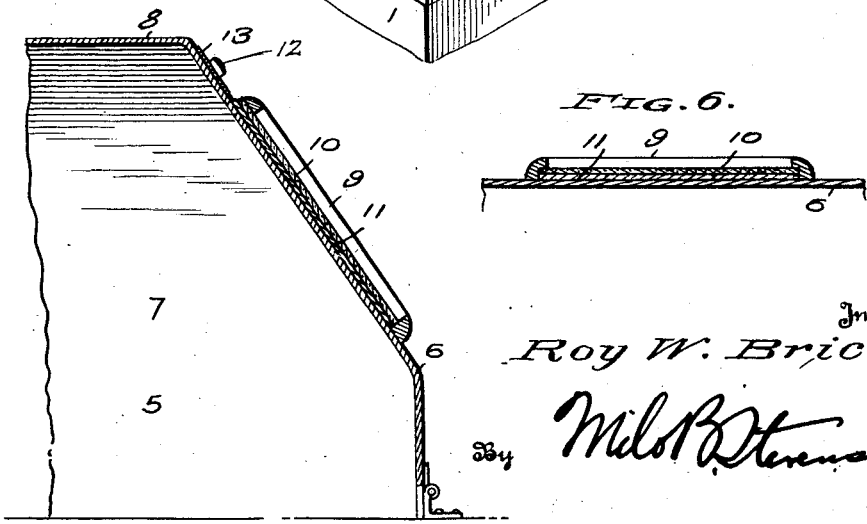
Inventor
Roy W. Brice
By
Attorney Patented June 11, 1929.

1,717,310

UNITED STATES PATENT OFFICE.

ROY W. BRICE, OF HOLLYWOOD, FLORIDA.

ICE-CREAM CABINET.

Application filed March 2, 1928. Serial No. 258,598.

My invention relates to improvements in store fixtures,—particularly ice-cream cabinets and the like,—and has for its primary object the provision of a combined ice-cream cabinet and counter.

In its more limited aspects the invention contemplates a removable super-structure or counter which is capable of being so positioned upon an ice cream cabinet to form therewith a structure of a height equal to the average store counter height,—the said superstructure being positionable to cover either the front or back row of ice cream cans to provide for clerk service or self-service by the customers,—respectively.

A still further object of the invention is to provide a super-structure hingedly connectable to the top of an ice cream cabinet whereby the same may be swung to a position to expose the cans for removal without necessitating the detachment of the super-structure from the cabinet.

Another object of the invention resides in the provision of a counter attachment for ice cream cabinets having a number of indicia carrying portions spaced to conform to the relative location of the ice cream cans in the cabinet,—the said indicia carrying portions being adapted to receive written, printed, or pictorial matter indicating the kind of ice cream in the respective cabinet compartments and also the price thereof.

The foregoing and other objects of the invention are attained by means of a novel combination and arrangement of parts to be hereinafter described and claimed,—reference being had to the accompanying drawings which illustrate the now preferred form of the invention. It is to be understood, however, that the invention is capable of various changes and departures in and from the structure shown and described without a digression from the spirit and scope of the subject matter claimed.

In the drawings,

Fig. 1 is a perspective view of a combined ice cream cabinet and counter constructed in accordance with my invention and arranged for self-service on the part of the customer;

Fig. 2 is a cross-sectional view taken on the line 2—2 of Fig. 1;

Fig. 3 is a view similar to Fig. 2 but showing the super-structure tilted forwardly to expose the cans for removal;

Fig. 4 is a perspective view taken from a point in front of the counter and at about the height of the customers' eyes,—the same showing the use of duplicate superstructures upon double row cabinets when the same are not used on the self-service plan;

Fig. 5 is a detail sectional view taken on the line 4—4 of Fig. 1 and showing the construction of one of the indicia card receiving frames, showing the slot for receiving the price tag.

Fig. 6 is a detail sectional view taken on the line 6—6 of Fig. 1.

Referring specifically to the drawing wherein the same reference characters have been used to designate the same parts throughout,—numeral 1 denotes a conventional ice cream cabinet of the electrical type and which includes a double row of ice cream can compartments 2 for receiving the cans 3, and which compartments are provided with the usual closures 4.

The super structure 5 comprises a rectangular casing having front, side and top walls 6, 7 and 8, respectively and being open at the back and bottom. The lower portion of the front wall is perpendicular for a short distance and then slants rearwardly toward the top wall 8,—the slanted portion of said front wall 6 being formed with a number of spaced frames 9 adapted to receive a glass panel 10 and a display card 11 rearwardly of the panel. Each frame 9 has its upper horizontal portion provided with a slot 12 for the insertion of a price tag 13 as shown in Fig. 5.

As shown in Figures 1 and 4 the super-structure 9 serves to convert the cabinet into a counter,—it being observed that the super-structure or attachment is hinged at its front wall 6 to the top of the cabinet 1 as indicated at 14.

The slanted portion displays the cards 11 in a plane at right angles to the line of vision of the customer to appraise him as to the contents of each of the compartments 2. To adapt the ice cream cabinet for self-service the super-structure 5 is disposed over the rear row of cans 3 the contents of which is preferably the same as corresponding cans in the front row. When it is desired to remove one of the cans 3 from the rear row of compartments 2 it is only necessary to swing the entire super-structure forwardly to the position shown in Fig. 3,—in which it is observed that the perpendicular portion of the front wall 6 rests upon the front row of closures 4 so that the glass panels 10 are protected from contact with the closure knobs or handles 4ᵃ.

In the arrangement shown in Fig. 4 it is possible to have a different kind of ice cream in each compartment and at the same time, by virtue of the rearwardly slanting front walls of the super-structure 5, to readily indicate through the cards 11 the flavor of the ice cream in each compartment.

When the super-structure 5 is used for self-service on the part of the customer, as in Fig. 1, it is still possible for a clerk behind the counter to dip ice cream out of the corresponding rear cans 3 in the event that the customer prefers to be waited on rather than wait on himself.

The super-structure 5 in addition to providing a counter for the cabinet 1 also serves to protect the subjacent row of cans 3 from dirt and other foreign matter when the lids of the cabinet are removed.

From the foregoing description, read in connection with the accompanying drawings, it is believed that the construction and advantages of the subject matter will be readily understood and appreciated by those skilled in the art. While the invention has been illustrated in connection with ice cream cabinets and will doubtless find its greatest utility in this field,—yet it is to be understood that the supercounter structure is capable of application to other receptacles.

Having thus described my invention what I claim as new and desire to secure by Letters Patent is:

1. A merchandizing cabinet having a top opening, a hollow counter-forming casing hinged to said cabinet over said top opening in a manner to swing clear of the space above said opening to afford free access to the same when filling the cabinet.

2. A merchandizing cabinet having a top opening, a hollow counter-forming casing hinged to said cabinet over said top opening in a manner to swing clear of the space above said opening to afford free access to the same when filling the cabinet, said casing having an opening at one side affording access to the opening in the cabinet when the casing is in place over the cabinet opening.

3. In an ice cream dispensing cabinet having front and rear top openings, the front opening having a handled closure, the combination of a hollow counter forming casing pivoted over said rear top opening and swingable to a position clear of the space above the same to afford free access to such rear opening, said casing having a narrow upright wall at its front and an inclined wall extending rearwardly and upwardly from said upright wall whereby when said casing is swung clear of the rear opening the inclined wall will be spaced from the plane of the openings in the cabinet, the closure and its handle so as to prevent injury to said rearwardly extending wall.

In testimony whereof I affix my signature.

ROY W. BRICE.